US012733680B2

(12) United States Patent
Kim et al.

(10) Patent No.: US 12,733,680 B2
(45) Date of Patent: Sep. 15, 2026

(54) AEROSOL GENERATING DEVICE INCLUDING AIRFLOW PASSAGE

(71) Applicant: KT&G CORPORATION, Daejeon (KR)

(72) Inventors: Dong Sung Kim, Seoul (KR); Dae Nam Han, Seoul (KR); Yong Hwan Kim, Gyeonggi-do (KR); Seung Won Lee, Gyeonggi-do (KR); Seok Su Jang, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 531 days.

(21) Appl. No.: 18/270,768

(22) PCT Filed: Mar. 4, 2022

(86) PCT No.: PCT/KR2022/003074

§ 371 (c)(1), (2) Date: Jul. 3, 2023

(87) PCT Pub. No.: WO2022/191517

PCT Pub. Date: Sep. 15, 2022

(65) Prior Publication Data

US 2024/0049797 A1 Feb. 15, 2024

(30) Foreign Application Priority Data

Mar. 11, 2021 (KR) ........................ 10-2021-0031902

(51) Int. Cl.

*A24F 40/48* (2020.01)
*A24F 40/20* (2020.01)

(Continued)

(52) U.S. Cl.

CPC .............. *A24F 40/48* (2020.01); *A24F 40/20* (2020.01); *A24F 40/465* (2020.01); *H05B 6/108* (2013.01)

(58) Field of Classification Search

None

See application file for complete search history.

(56) References Cited

U.S. PATENT DOCUMENTS

2014/0338686 A1 11/2014 Plojoux et al.
2019/0142069 A1 5/2019 Qiu (Continued)

FOREIGN PATENT DOCUMENTS

CN 104095291 A 10/2014
CN 104135881 A 11/2014

(Continued)

OTHER PUBLICATIONS

Extended European Search Report dated Oct. 1, 2024, received in European Patent Application No. 22767413.2.

(Continued)

*Primary Examiner* — Linda L Gray
(74) *Attorney, Agent, or Firm* — Foley & Lardner LLP

(57) ABSTRACT

Provided is an aerosol generating device including a susceptor, a coil, a housing, and a first flow passage. The first flow passage includes: an outer flow passage between the housing and the coil; and an inner flow passage between the coil and the susceptor and in fluid communication with the outer flow passage.

14 Claims, 9 Drawing Sheets

(51) Int. Cl.
*A24F 40/465* (2020.01)
*H05B 6/10* (2006.01)

(56) References Cited

U.S. PATENT DOCUMENTS

| | | | |
|---|---|---|---|
| 2020/0170301 A1 | 6/2020 | Gallagher et al. | |
| 2020/0187555 A1* | 6/2020 | Lee | F16J 15/021 |
| 2020/0275705 A1 | 9/2020 | Rogan et al. | |
| 2020/0329771 A1 | 10/2020 | Vanko | |
| 2020/0390156 A1* | 12/2020 | An | A24F 40/51 |
| 2021/0059310 A1 | 3/2021 | Rogan et al. | |
| 2021/0145051 A1 | 5/2021 | Florack et al. | |
| 2023/0051019 A1 | 2/2023 | Gill | |
| 2023/0108821 A1 | 4/2023 | Yoon | |

FOREIGN PATENT DOCUMENTS

| | | | | |
|---|---|---|---|---|
| CN | 106037011 | A | 10/2016 | |
| CN | 109123807 | A | 1/2019 | |
| CN | 111108813 | A | 5/2020 | |
| CN | 111163820 | A | 5/2020 | |
| CN | 111526746 | A | 8/2020 | |
| CN | 112218553 | A | 1/2021 | |
| CN | 112369696 | A | 2/2021 | |
| KR | 10-2018-0125493 | A | 11/2018 | |
| KR | 10-2020-0031605 | A | 3/2020 | |
| KR | 10-2020-0056994 | A | 5/2020 | |
| KR | 10-2020-0057034 | A | 5/2020 | |
| KR | 10-2020-0101351 | A | 8/2020 | |
| KR | 10-2020-0101926 | A | 8/2020 | |
| KR | 10-2020-0103014 | A | 9/2020 | |
| RU | 2 720 903 | C1 | 5/2020 | |
| WO | 2018/087335 | A1 | 5/2018 | |
| WO | WO-2019030602 | A1 * | 2/2019 | A61M 11/042 |
| WO | 2020/035586 | A1 | 2/2020 | |
| WO | WO-2021/001268 | A1 | 1/2021 | |
| WO | WO-2021/001511 | A1 | 1/2021 | |
| WO | WO-2021/037820 | A1 | 3/2021 | |

OTHER PUBLICATIONS

Office Action issued Mar. 6, 2024 in Russian Application No. 2023120400.

Notice of Non-Final Rejection for Korean Application No. 10-2021-031902 dated Aug. 23, 2022.

Notice of Allowance for Korean Application No. 10-2021-0031902 dated Feb. 10, 2023.

International Search Report for PCT/KR2022/003074 dated Jun. 13, 2022.

Written Opinion for PCT/KR2022/003074 dated Jun. 13, 2022.

Chinese Office Action on CN Patent Application No. 202280012377.1 dated Dec. 26, 2025.

* cited by examiner

[Fig. 1]
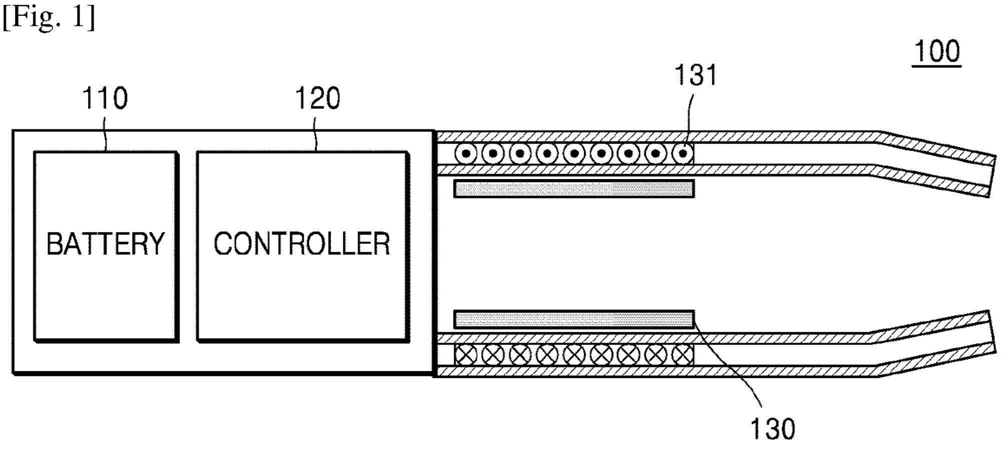
[Fig. 2]
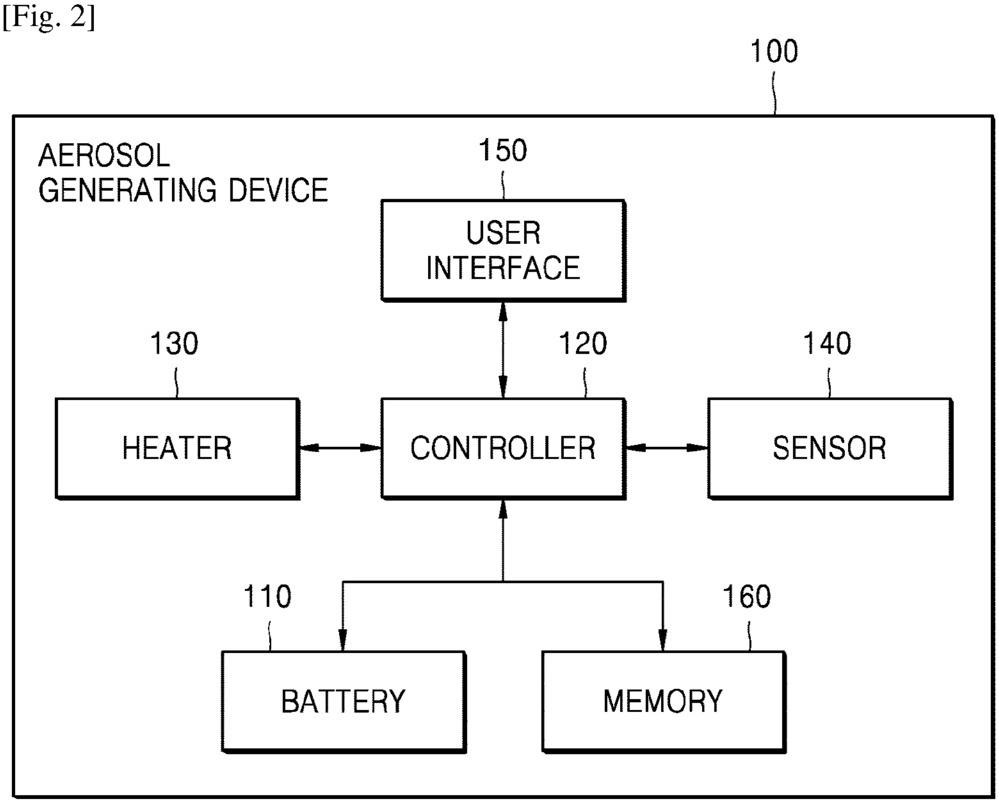

[Fig. 3]
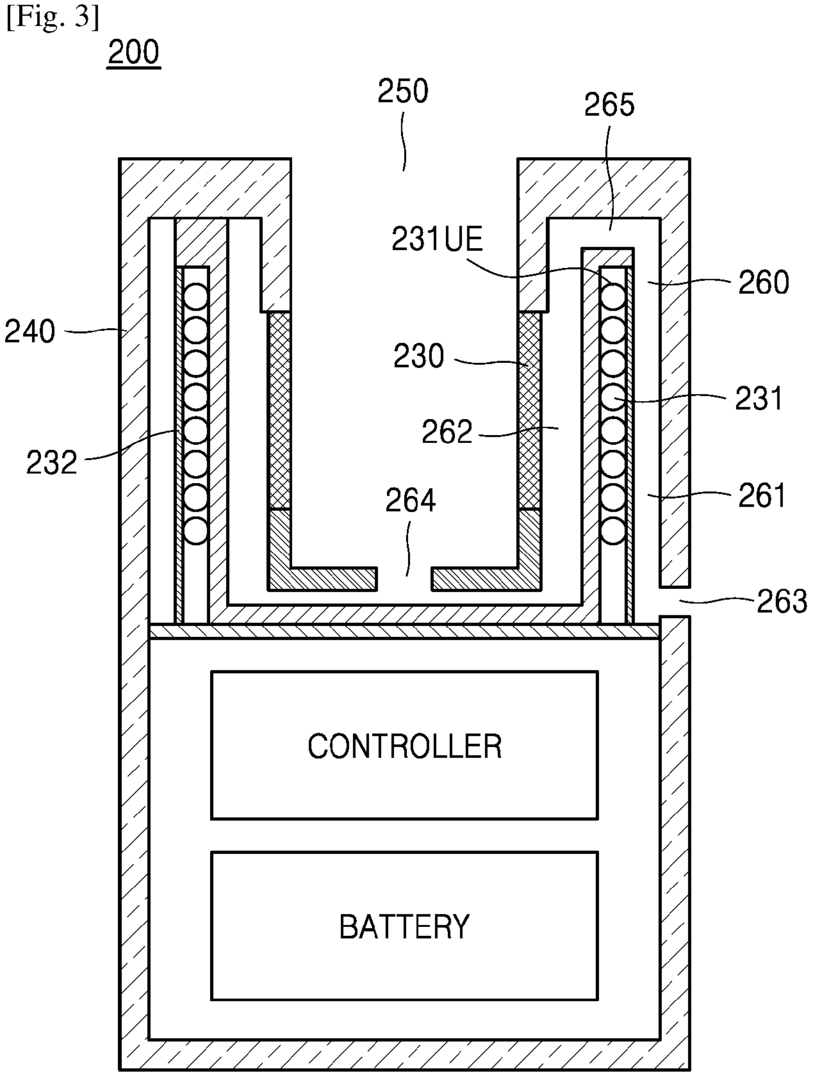

[Fig. 4]
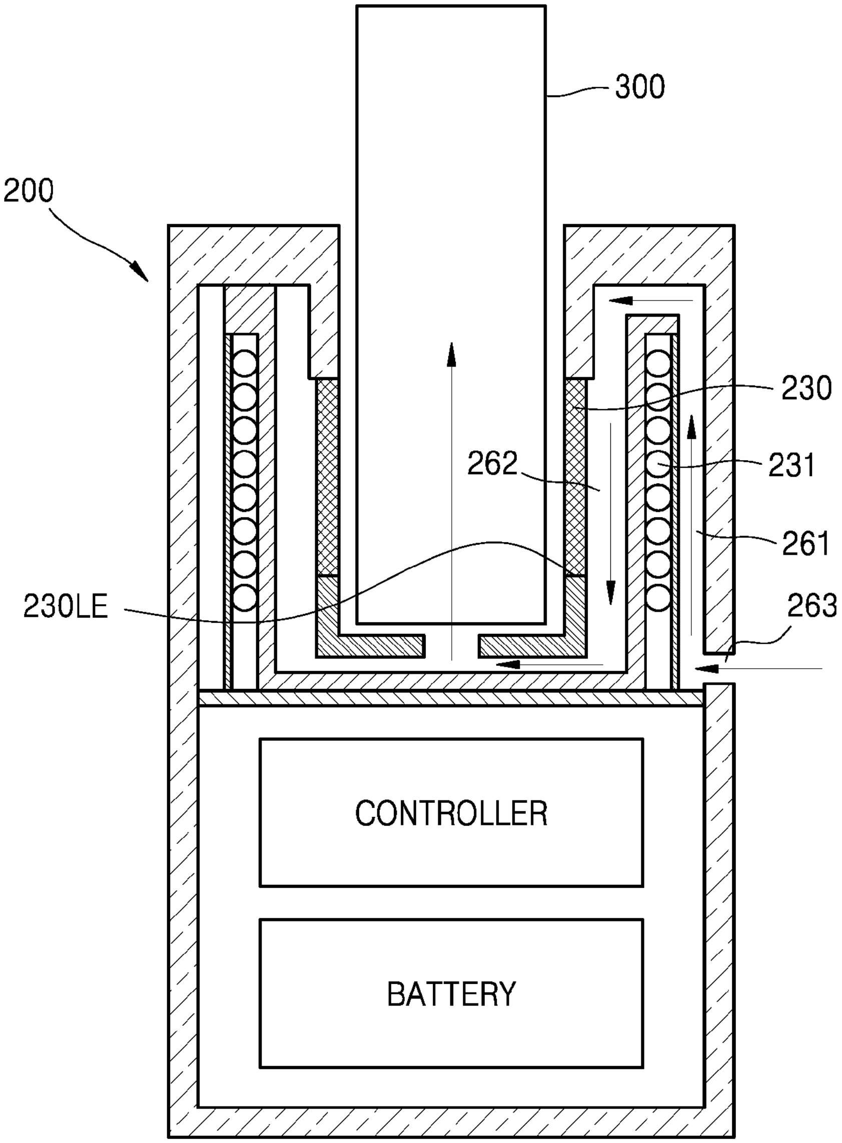

[Fig. 5]
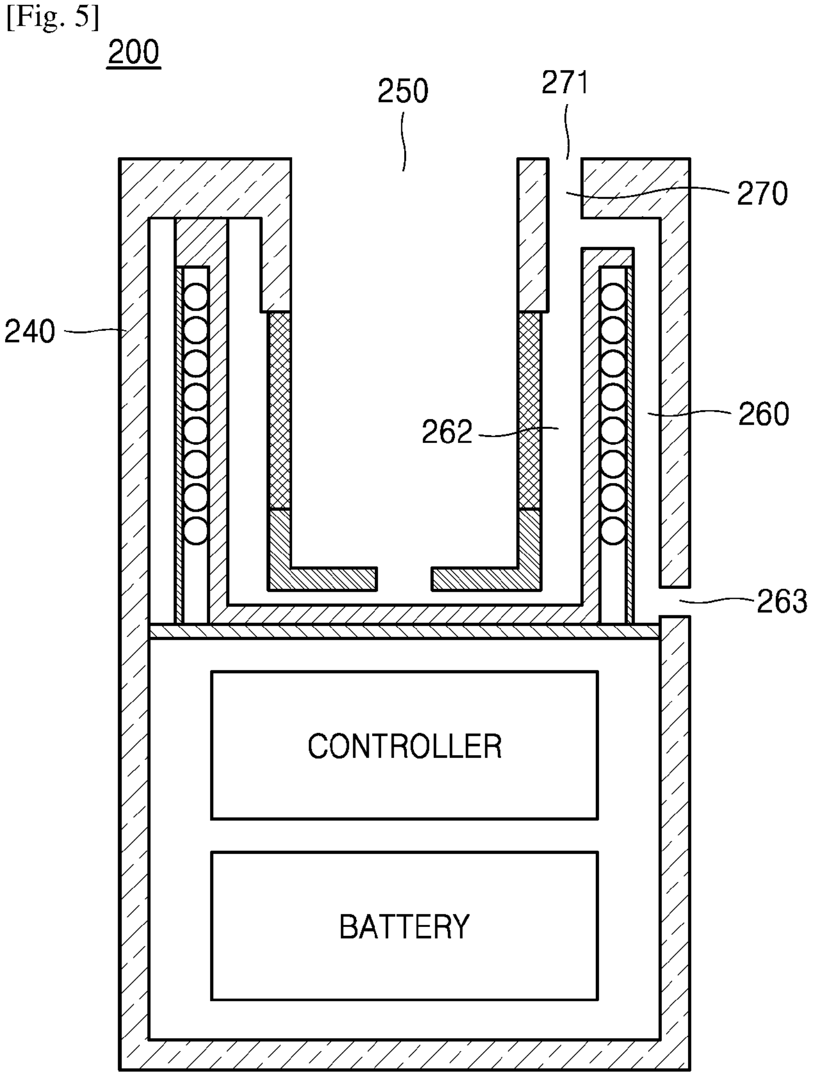

[Fig. 6]
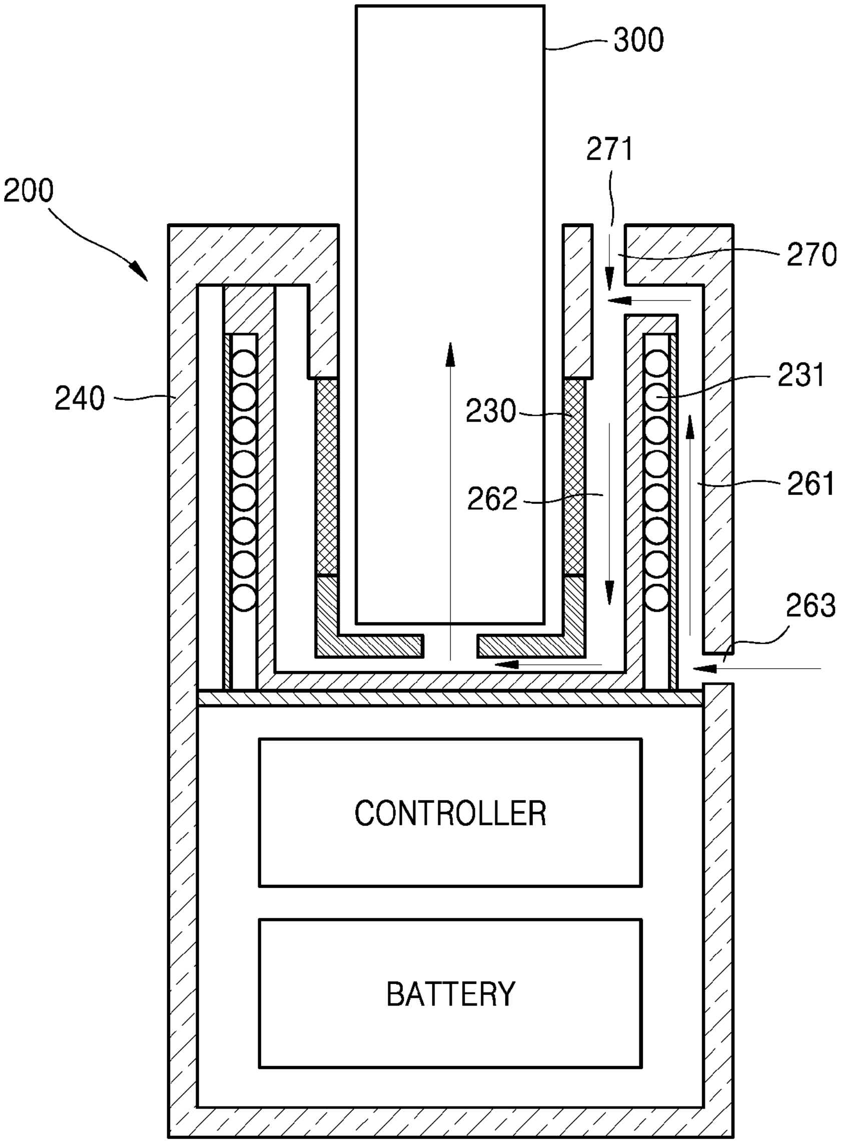

[Fig. 7]
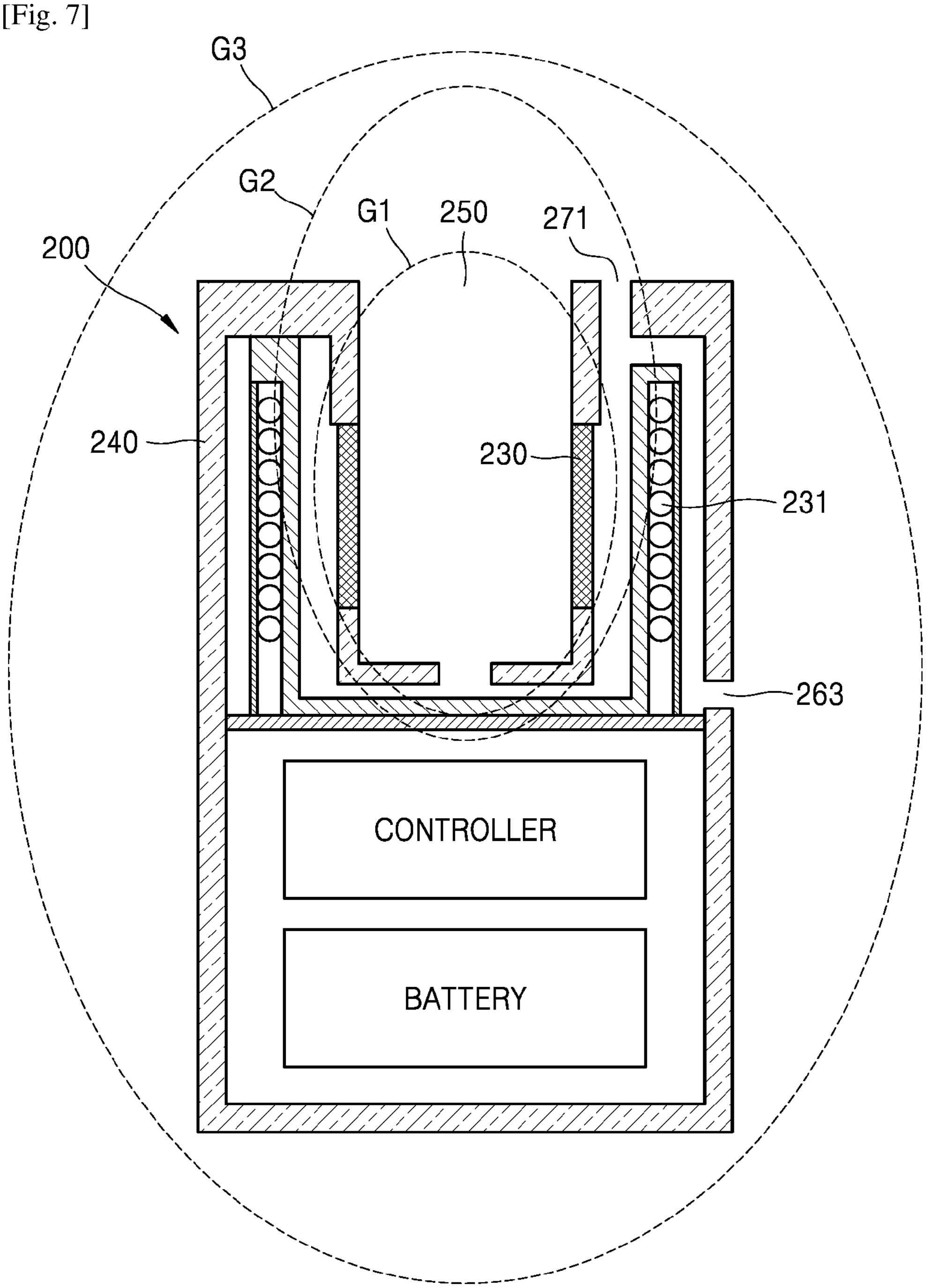

[Fig. 8]
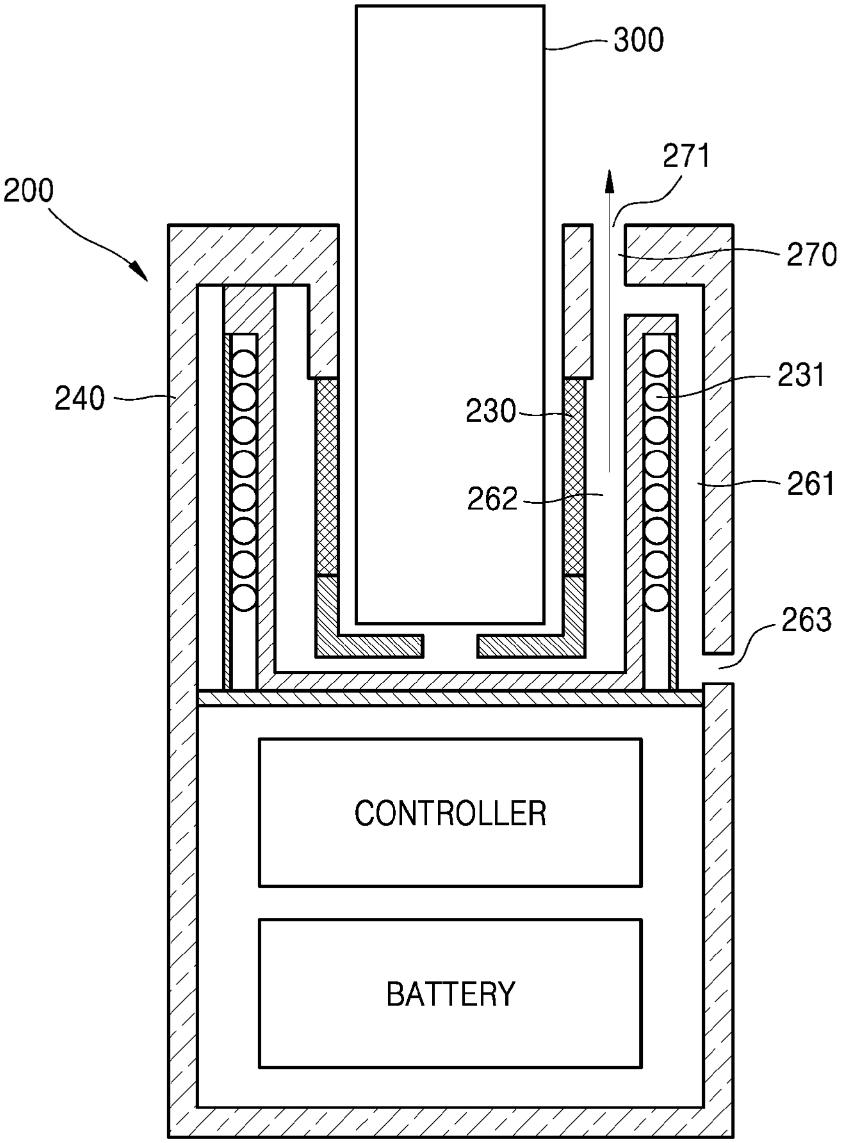

[Fig. 9]
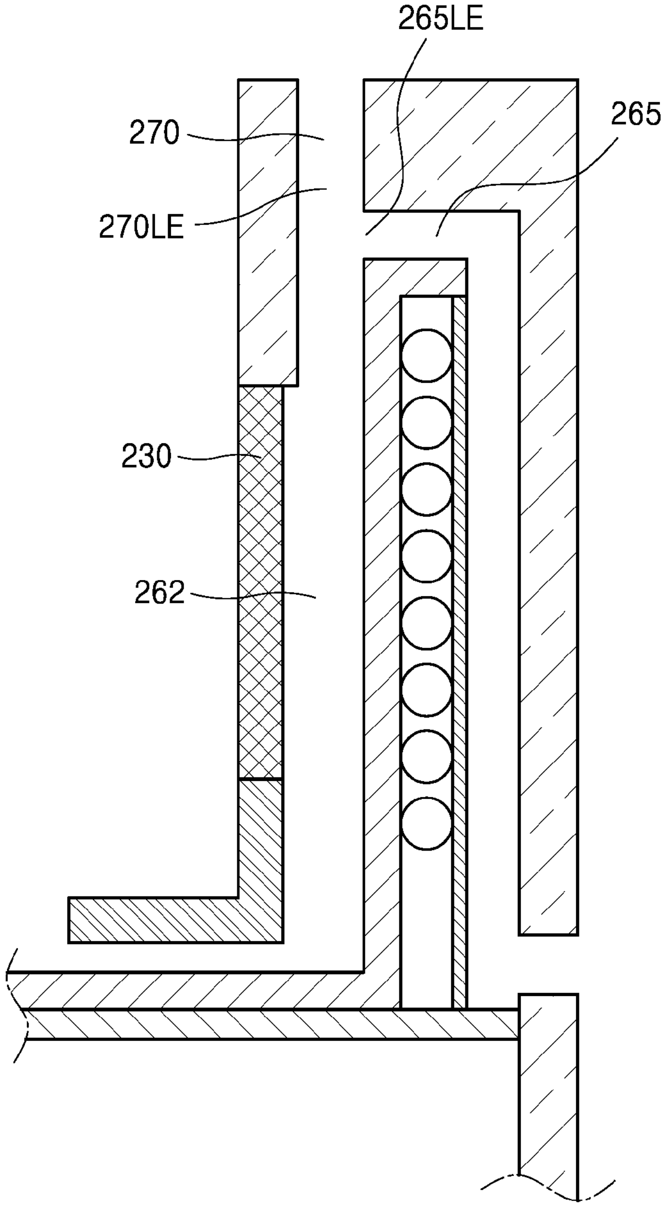

[Fig. 10]
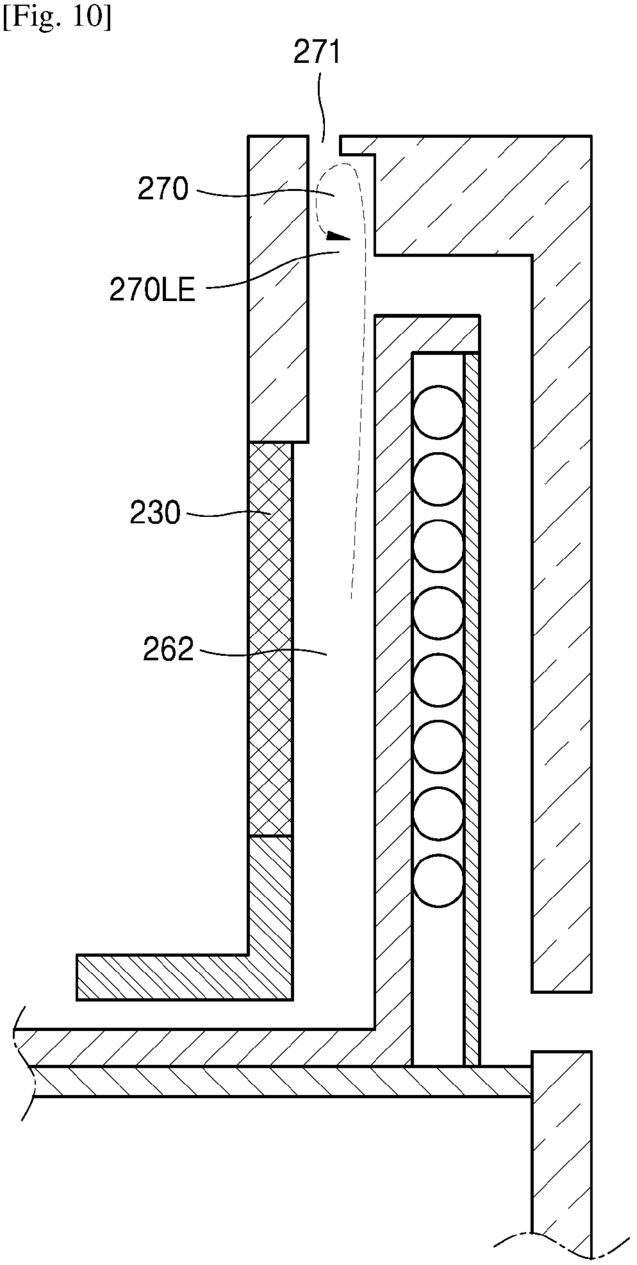

AEROSOL GENERATING DEVICE INCLUDING AIRFLOW PASSAGE

CROSS REFERENCE TO RELATED APPLICATIONS

This application is a National Stage of International Application No. PCT/KR2022/003074 filed Mar. 4, 2022, claiming priority based on Korean Patent Application No. 10-2021-0031902 filed Mar. 11, 2021.

TECHNICAL FIELD

One or more embodiments of the present disclosure relate to an aerosol generating device including an airflow passage.

BACKGROUND ART

Recently, the demand for alternative methods to overcome the disadvantages of traditional cigarettes has increased. For example, there is growing demand for an aerosol generating device which generates aerosol by heating an aerosol generating material, rather than by combusting cigarettes. Accordingly, researches on a heating-type aerosol generating device has been actively conducted.

DISCLOSURE

Technical Problem

An aerosol generating article may generate an aerosol when heated by a heater. If a user receives heat from the heater while gripping an aerosol generating device, the user may feel uncomfortable.

The generated aerosol may be delivered by air and provided to the user. A low temperature of air that serves as a carrier of an aerosol may reduce the quality of the aerosol.

Embodiments of the present disclosure are not limited thereto. It is to be appreciated that other embodiments will be apparent to those skilled in the art from a consideration of the specification or practice of the present disclosure described herein.

Technical Solution

One or more embodiments of the present disclosure provide an aerosol generating device capable of blocking heat transferred from a heater to a housing, for a user's comfortable grip.

One or more embodiments of the present disclosure also provide an aerosol generating device capable of using air having an appropriate temperature as a carrier of the aerosol, in order to maintain the quality of an aerosol.

One or more embodiments of the present disclosure also provide an aerosol generating device capable of preventing condensation from occurring due to a temperature difference between a high-temperature heater and a low-temperature housing.

According to one aspect of the present disclosure, an aerosol generating device includes: a housing including an insertion hole into which an aerosol generating article is inserted; a susceptor located in the housing and configured to heat the aerosol generating article; a coil arranged in the housing to surround the susceptor; a housing arranged outside the coil; and a first flow passage configured to allow air to flow from outside of the housing into the aerosol generating article, wherein the first flow passage includes an outer flow passage between the housing and the coil and an inner flow passage between the coil and the susceptor, wherein the inner flow passage is in fluid communication with the outer flow passage.

Advantageous Effects

According to various embodiments of the present disclosure, heat generated from the susceptor is insulated by the air in the outer flow passage, so that a user may comfortably grip the aerosol generating device.

In addition, according to various embodiments of the present disclosure, by heating the air in the inner flow passage, air having an appropriate temperature may be used as a carrier. Thereby, a rich aerosol may be provided to the user.

Furthermore, according to various embodiments of the disclosure, dew condensation may be prevented thanks to a structure of a flow passage.

Embodiments of the present disclosure are not limited thereto. It is to be appreciated that other embodiments will be apparent to those skilled in the art from a consideration of the specification or practice of the present disclosure described herein.

DESCRIPTION OF DRAWINGS

FIG. 1 is a diagram illustrating components constituting an aerosol generating device, according to an embodiment.

FIG. 2 is a block diagram illustrating a configuration of an aerosol generating device, according to an embodiment.

FIG. 3 is a diagram illustrating a first flow passage of an aerosol generating device, according to an embodiment.

FIG. 4 is a diagram illustrating airflow of a first flow passage of an aerosol generating device, according to an embodiment.

FIG. 5 is a diagram illustrating a second flow passage of an aerosol generating device, according to an embodiment.

FIG. 6 is a diagram illustrating airflow of an aerosol generating device, according to an embodiment.

FIG. 7 is a schematic diagram illustrating a temperature distribution in an aerosol generating device, according to an embodiment.

FIG. 8 is a diagram illustrating a flow of air heated by an inner flow passage, according to an embodiment.

FIG. 9 is a diagram illustrating structures of a second flow passage and a connection flow passage, according to an embodiment.

FIG. 10 is a diagram illustrating a structure of a second flow passage, according to an embodiment.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings FIG. 1 is a diagram illustrating components constituting an aerosol generating device, according to an embodiment.

Referring to FIG. 1, an aerosol generating device 100 may include a heater 130, a coil 131, a battery 110, and a controller 120. However, embodiments of the present disclosure are not limited thereto, and other general-purpose components other than those shown in FIG. 1 may be further included in the aerosol generating device 100.

The aerosol generating device 100 may generate an aerosol from an aerosol generating article accommodated in the aerosol generating device 100 by induction heating. The induction heating may refer to a method of applying an alternating magnetic field to a magnetic material, which is heated by an external magnetic field.

If the alternating magnetic field is applied to the magnetic material, energy loss due to eddy current loss and hysteresis loss may occur in the magnetic material, and the lost energy may be emitted from the magnetic material as thermal energy. The greater an amplitude or frequency of the alternating magnetic field applied to the magnetic material is, the greater the thermal energy emitted from the magnetic material becomes. The aerosol generating device 100 may emit thermal energy from the magnetic material by applying the alternating magnetic field to the magnetic material, and may transfer the thermal energy emitted from the magnetic material to the aerosol generating article.

The magnetic material that generates heat by the external magnetic field may be a susceptor. The susceptor may be provided in the aerosol generating device 100, in the form of a piece, a flake, or a strip. For example, at least a portion of the heater 130 arranged in the aerosol generating device 100 may be formed of a susceptor material.

At least a portion of the susceptor material may be formed of a ferromagnetic material. For example, the susceptor material may include a metal or carbon. The susceptor material may include at least one of ferrite, a ferromagnetic alloy, stainless steel, and aluminum (Al). Alternatively, the susceptor material may include at least one of ceramic such as graphite, molybdenum, silicon carbide, niobium, a nickel alloy, a metal film, zirconia, or the like, a transition metal such as nickel (Ni), cobalt (Co), or the like, and a metalloid such as boron (B) or phosphorus (P).

The aerosol generating device 100 may accommodate the aerosol generating article. The aerosol generating device 100 may include a space to accommodate the aerosol generating article. The heater 130 may be arranged in the space to accommodate the aerosol generating article. For example, the heater 130 may have a cylindrical-shaped accommodation space to accommodate the aerosol generating article therein. Therefore, if the aerosol generating article is accommodated in the aerosol generating device 100, the aerosol generating article may be accommodated in the accommodation space of the heater 130.

The heater 130 may surround at least a portion of an outer surface of the aerosol generating article accommodated in the aerosol generating device 100. For example, the heater 130 may surround a tobacco medium included in the aerosol-generating article such that heat may be more efficiently transferred from the heater 130 to the tobacco medium.

The heater 130 may heat the aerosol-generating article accommodated in the aerosol-generating device 100. As described above, the heater 130 may heat the aerosol-generating article by induction heating. The heater 130 may include the susceptor material to generate heat in the external magnetic field, and the aerosol generating device 100 may apply the alternating magnetic field to the heater 130.

The coil 131 may be provided in the aerosol generating device 100. The coil 131 may apply the alternating magnetic field to the heater 130. If power is supplied to the coil 131 from the aerosol generating device 100, a magnetic field may be formed inside the coil 131. If an alternating current is applied to the coil 131, a direction of the magnetic field inside the coil 131 may continuously change. If the heater 130 located inside the coil 131 is exposed to the alternating magnetic field, the heater 130 may generate heat, and thus the aerosol-generating article accommodated in the accommodation space of the heater 130 may be heated.

The coil 131 may be wound around the heater 130. For example, the coil 131 may be wound along an inner surface of an outer housing of the aerosol generating device 100, such that the heater 130 located in an inner space is surrounded by the coil 131. When power is supplied to the coil 131, the alternating magnetic field generated by the coil 131 may be applied to the heater 130.

The coil 131 may extend in a longitudinal direction (i.e., lengthwise direction) of the aerosol generating device 100. The coil 131 may extend to an appropriate length in the longitudinal direction of the aerosol generating device 100. For example, the coil 131 may extend to a length corresponding to a length of the heater 130, or may extend to a length greater than the length of the heater 130.

The coil 131 may be arranged at a location suitable to apply the alternating magnetic field to the heater 130. For example, the coil 131 may be arranged at a location corresponding to the heater 130. Due to the size and arrangement of the coil 131, the alternating magnetic field of the coil 131 may be efficiently applied to the heater 130.

If an amplitude or frequency of the alternating magnetic field formed by the coil 131 is changed, a degree to which the heater 130 heats the aerosol generating article may be changed, accordingly. Since the amplitude or frequency of the magnetic field by the coil 131 may be changed by the power applied to the coil 131, the aerosol generating device 100 may regulate the power applied to the coil 131 to control heating of the aerosol generating article. For example, the aerosol generating device 100 may control an amplitude and frequency of an alternating current applied to the coil 131.

As an example, the coil 131 may be implemented by a solenoid. The coil 131 may be a solenoid wound along the inner surface of the outer housing of the aerosol generating device 100, and the heater 130 and the aerosol generating article may be located in an inner space of the solenoid. A material of conductive wire constituting the solenoid may be copper (Cu). However, embodiments of the present disclosure are not limited thereto, and the material of the conductive wire constituting the solenoid may any one of silver (Ag), gold (Au), aluminium (Al), tungsten (W), zinc (Zn), and nickel (Ni), or an alloy containing at least one thereof.

The battery 110 may supply power to the aerosol generating device 100. The battery 110 may also supply power to the coil 131. The battery 110 may include a battery to supply direct current to the aerosol generating device 100 and a converter to convert the direct current supplied from the battery into alternating current supplied to the coil 131.

The battery 110 may supply direct current to the aerosol generating device 100. The battery 110 may be a lithium iron phosphate ($LiFePO4$) battery, but is not limited thereto. For example, the battery may be a lithium cobalt oxide ($LiCoO2$) battery, a lithium titanate battery, a lithium polymer (LiPoly) battery, or the like.

The converter may include a low-pass filter to filter the direct current supplied from the battery to output the alternating current supplied to the coil 131. The converter may further include an amplifier to amplify the direct current supplied from the battery. For example, the converter may be implemented by the low-pass filter constituting a load network of a class-D amplifier.

The controller 120 may control power supply to the coil 131. The controller 120 may control the battery 110 to regulate the power supply to the coil 131. For example, the controller 120 may control the heater 130 to constantly maintain a temperature at which the heater 130 heats the aerosol generating article, based on a temperature of the heater 130.

FIG. 2 is a block diagram illustrating a configuration of an aerosol generating device, according to an embodiment.

Referring to FIG. 2, the aerosol generating device 100 may include a battery 110, a heater 130, a sensor 140, a user interface 150, a memory 160, and a controller 120. However, the internal structure of the aerosol generating device 100 is not limited to the structures illustrated in FIG. 2. According to the design of the aerosol generating device 100, it will be understood by one of ordinary skill in the art that some of the components shown in FIG. 2 may be omitted or new components may be added.

The battery 110 supplies power to be used for the aerosol generating device 100 to operate. In other words, the battery 110 may supply power such that the heater 130 may be heated. In addition, the battery 110 may supply power required for operation of other components included in the aerosol generating device 100, that is, the sensor 140, the user interface 150, the memory 160, and the controller 120. The battery 110 may be a rechargeable battery or a disposable battery.

The aerosol generating device 100 may include at least one sensor 140. A result sensed by the at least one sensor 140 is transmitted to the controller 120, and the controller 120 may control the aerosol generating device 100 to perform various functions such as controlling the operation of the heater, restricting smoking, determining whether an aerosol generating article is inserted, and displaying a notification.

For example, the at least one sensor 140 may include a puff sensor. The puff sensor may detect a user's puff based on any one of a temperature change, a flow change, a voltage change, and a pressure change.

In addition, the at least one sensor 140 may include a temperature sensor to measure a temperature of the heater 130 (or an aerosol-generating article). The aerosol generating device 100 may include a separate temperature sensor for sensing a temperature of the heater 130, or the heater 130 itself may serve as a temperature sensor instead of including a separate temperature sensor. Alternatively, a separate temperature sensor may be further included in the aerosol generating device 100 while the heater 130 serves as a temperature sensor.

In addition, the at least one sensor 140 may include the temperature sensor to measure an ambient temperature of the aerosol generating device 100. The ambient temperature is a temperature outside the aerosol generating device 100. The ambient temperature is the temperature of the atmosphere in which an aerosol generated from the aerosol generating article in the aerosol generating device 100 is discharged. The temperature sensor may be arranged outside the housing to measure the ambient temperature, or arranged on a path through which air is introduced from outside. The temperature sensor may transmit a measured value of the ambient temperature to the controller 120, and the controller 120 may determine a heating profile to be used to heat the aerosol-generating article, based on the ambient temperature.

In addition, the at least one sensor may include a humidity sensor. The humidity sensor may measure the ambient humidity of the aerosol generating device 100. The ambient humidity is humidity outside the aerosol generating device 100. The ambient humidity is the humidity of the atmosphere in which the aerosol generated from the aerosol-generating article in the aerosol-generating device 100 is discharged. The humidity sensor may be arranged outside the housing to measure the ambient humidity, or arranged on the path through which air is introduced from outside. The humidity sensor may transmit a measured value of the ambient humidity to the controller 120, and the controller 120 may determine the heating profile to be used to heat the aerosol-generating article, based on the ambient humidity.

In addition, the at least one sensor may include an inductive sensor. The inductive sensor may detect whether the aerosol-generating article is inserted into the aerosol-generating device 100. According to one example, the aerosol-generating article may include a metallic material, such as aluminum (Al), and the inductive sensor may detect a change in inductance that occurs while the aerosol-generating article is inserted into the aerosol-generating device 100. However, embodiments of the present disclosure are not limited thereto, and the inductive sensor may be replaced by another type of sensor, such as an optical sensor, a temperature sensor, or a resistive sensor.

Upon detecting the insertion of the aerosol-generating article, the controller 120 may control the aerosol-generating device 100 to automatically start heating without an additional input from outside. Upon detecting the insertion of the aerosol-generating article, the controller 120 may control the battery 110 to supply power to the coil. However, embodiments of the present disclosure are not limited thereto, and the controller 120 may control the aerosol generating device 100 to start heating only when there is an additional input from outside.

The user interface 150 may provide the user with information about the state of the aerosol generating device 100. The user interface 150 may include various interfacing devices, such as a display or a light emitter for outputting visual information, a motor for outputting haptic information, a speaker for outputting sound information, input/output (I/O) interfacing devices (e.g., a button or a touch screen) for receiving information input from the user or outputting information to the user, terminals for performing data communication or receiving charging power, and communication interfacing modules for performing wireless communication (e.g., Wi-Fi, Wi-Fi direct, Bluetooth, near-field communication (NFC), etc.) with external devices.

However, the aerosol generating device 100 may be implemented by selecting only some of the above-described examples of various user interface 150.

The user interface 150 may include a display to output visual information regarding the aerosol generating device 100. Here, the visual information regarding the aerosol generating device 100 may include any information regarding an operation of the aerosol generating device 100. For example, the display may output information on a state of the aerosol-generating device 100 (e.g., availability of the aerosol-generating device, and the like), information on the heater 130 (e.g., start of preheating, progress of preheating, completion of preheating, and the like), information on the battery 110 (e.g., remaining capacity of the battery, availability of the battery, and the like), information on resetting of the aerosol generating device 100 (e.g., a time for resetting, progress of resetting, completion of resetting, and the like), information on cleaning of the aerosol generating device 100 (e.g., a time for cleaning, need of cleaning, progress of cleaning, completion of cleaning, and the like), information on charging of the aerosol generating device 100 (e.g., need of charging, progress of charging, completion of charging, and the like), information on puffs (e.g., the number of puffs, notification about the end of puffs, etc.), information on safety (e.g., lapse of use time), or the like.

A communication interface may communicate with an external device, an external server, and the like, and may also be connected to the same. For example, the communication interface may be implemented in a form that supports at least one communication method, such as various types of digital interfaces, application processor (AP)-based wireless fidelity (Wi-Fi) (wireless local area network (LAN), Bluetooth, Zigbee, wired/wireless LAN, wide area network (WAN), Ethernet, Institute of Electrical and Electronics Engineers (IEEE) 1394, high definition multimedia interface (HDMI), universal serial bus (USB), mobile high-definition link (MHL), advanced encryption standard (AES)/European broadcasting union (EBU), optical, coaxial, and the like. In addition, the communication interface may include a transition minimized differential signaling (TMDS) channel to transmit video and audio signals, a display data channel (DDC) to transmit and receive device information, video or audio related information (e.g., enhanced extended display identification data (E-EDID)), and consumer electronic control (CEC) to transmit and receive a control signal. However, embodiments of the present disclosure are not limited thereto, and the communication interface may be implemented by various types of interfaces.

The memory 160, as a hardware component configured to store various pieces of data processed in the aerosol generating device 100, may store data processed or to be processed by the controller 120. The memory 160 may include various types of memories; random access memory (RAM), such as dynamic random access memory (DRAM) and static random access memory (SRAM), etc.; read-only memory (ROM); electrically erasable programmable read-only memory (EEPROM), etc.

The memory 160 may store an operation time of the aerosol generating device 100, the maximum number of puffs, the current number of puffs, at least one temperature profile, data on a user's smoking pattern, etc.

The controller 120 may generally control operations of the aerosol generating device 100. The controller 120 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

Although not illustrated in FIG. 2, the aerosol generating device 100 may form an aerosol generating system together with an additional cradle. For example, the cradle may be used to charge the battery 110 of the aerosol generating device 100. For example, while the aerosol generating device 100 is accommodated in an accommodation space of the cradle, the aerosol generating device 100 may receive power from a battery of the cradle such that the battery 110 of the aerosol generating device 100 may be charged.

In the following drawings, it is considered that the up, down, left, and right of the aerosol generating device are the same as the up, down, left, and right of the drawing.

FIG. 3 is a diagram illustrating a first flow passage 260 of an aerosol generating device 200, according to an embodiment.

The aerosol generating device 200 according to an embodiment includes a susceptor 230, a coil 231, a housing 240, and the first flow passage 260.

The aerosol-generating device 200 may include an insertion hole 250 configured to receive an aerosol-generating article. The insertion hole 250 may be arranged on an upper portion of the aerosol generating device 200. More specifically, the insertion hole 250 may be arranged on an upper surface of the housing 240.

The susceptor 230 may correspond to the heater 130 of FIGS. 1 and 2. The susceptor 230 may be configured to heat the aerosol generating article. The susceptor 230 may be configured to form a space in which the aerosol-generating article is accommodated. For example, the susceptor 230 may have a cylindrical shape, but is not limited thereto.

The coil 231 may correspond to the coil 131 of FIGS. 1 and 2. The coil 231 may be arranged to surround the susceptor 230. A blocking wall 232 for blocking an electromagnetic wave may be arranged outside the coil 231.

The housing 240 may be arranged outside the coil 231. The housing 240 may be configured to accommodate the coil 231 and the susceptor 230. The housing 240 may also be configured to accommodate a controller and a battery. The housing 240 may form an exterior of the aerosol generating device 200. The housing 240 may be a single component or an assembly. For example, the housing 240 may be an assembly of a component accommodating the coil 231 and another component accommodating the controller and the battery, but is not limited thereto.

The first flow passage 260 may be configured to allow air to flow from outside of the housing 240 into the aerosol-generating article. The first flow passage 260 may include a first inlet 263, an outer flow passage 261, a connection flow passage 265, an inner flow passage 262, and an outlet 264.

The first inlet 263 may be configured to allow air to flow from outside into the outer flow passage 261. The first inlet 263 and the insertion hole 250 may be formed on difference surfaces of the housing 240. According to an embodiment shown in FIG. 3, the insertion hole 250 is arranged on an upper surface of the housing 240, and the first inlet 263 is arranged on a side surface of the housing 240. While the susceptor 230 is heated, heat may be discharged through the insertion hole 250. By arranging the first inlet 263 and the insertion hole 250 on different surfaces, air introduced into the first inlet 263 may be prevented from being affected by the heat discharged through the insertion hole 250.

The outer flow passage 261 may be arranged between the coil 231 and the housing 240. For example, the outer flow passage 261 may be arranged between the electromagnetic wave blocking wall 232 and the housing 240. The outer flow passage 261 may be formed to extend between the housing 240 and the coil 231 such that air may flow upward. More specifically, the outer flow passage 261 may be configured such that air flows upward when a user inhales.

The inner flow passage 262 may be arranged between the susceptor 230 and the coil 231 such that air may flow downward. More specifically, the inner flow passage 262 may be configured such that air flows downward when the user inhales.

The connection flow passage 265 may be formed to extend from the outer flow passage 261 to the inner flow passage 262. For example, the connection flow passage 265 may be arranged above an upper end 231UE of the coil. Therefore, the outer flow passage 261, the inner flow passage 262, and the connection flow passage 265 may be formed to extend along the coil 231.

If the user does not inhale, heat or hot air of the inner flow passage 262 may move to the outer flow passage 261 through the connection flow passage 265. When the heat or hot air is transferred from the inner flow passage 262 to the housing 240, it may be unsafe for the user to grip the housing 240. In addition, condensation may occur if the heat or hot air from the inner flow passage 262 meet the cold housing 240. To resolve such problems, the connection flow passage 265 may be configured to have a cross-sectional area smaller than a cross-sectional area of the inner flow passage 262. In addition, the connection flow passage 265 may be perpendicularly connected to the inner flow passage 262. Due to the smaller cross-sectional area and a vertical connection of the connection flow passage 265, the heat or hot air may be prevented from moving from the inner flow passage 262 into the connection flow passage 265.

The outlet 264 may be configured to allow air to be discharged from the inner flow passage 262 to the aerosol generating article. The outlet 264 may be arranged to face the insertion hole 250, but is not limited thereto.

FIG. 4 is a diagram illustrating airflow of the first flow passage 260 of the aerosol generating device 200, according to an embodiment.

When a user inhales, air may flow from outside into the aerosol generating device 200 through the first inlet 263. The first inlet 263 may be arranged so as not to be affected by a heated susceptor. More specifically, the first inlet 263 may be arranged at a position lower than a lower end 230LE of the susceptor when the aerosol generating device 200 is in the upright position as shown in FIG. 4. Due to such arrangement, air at room temperature may flow into the first inlet 263 from the outside.

Air flowing downward in the inner flow passage 262 may be heated by the susceptor 230. The heated air may carry an aerosol generated from an aerosol generating article 300. As air is heated in the inner flow passage 262, air having an appropriate temperature may serve as a carrier. Thereby, a rich aerosol may be provided to the user.

Air flowing upward through the outer flow passage 261 may form a heat insulation layer. Since the air in the outer flow passage 261 is introduced from the outside, its temperature may be lower than that of the air in the inner flow passage 262. Heat generated from the susceptor 230 is insulated by the air of the outer flow passage 261, so that the user may comfortably grip the aerosol generating device 200.

FIG. 5 is a diagram illustrating a second flow passage 270 of the aerosol generating device 200, according to an embodiment.

The aerosol generating device 200 according to an embodiment includes the second flow passage 270 that allows air to flow from outside of the housing 240 into the first flow passage 260. More specifically, the second flow passage 270 may be configured to allow air to flow from outside of the housing 240 into the inner flow passage 262.

A second inlet 271 may be configured to allow air to flow from outside into the second flow passage 270. The second inlet 271 and the first inlet 263 may be arranged on different surfaces of the housing 240. For example, as shown in FIG. 5, the first inlet 263 may be arranged on a side surface of the housing 240, and the second inlet 271 may be arranged on an upper surface of the housing 240. More specifically, the second inlet 271 may be arranged near the insertion hole 250. While a susceptor is heated, heat may be discharged through the insertion hole 250. Since the second inlet 271 is adjacent to the insertion hole 250, the heat discharged through the insertion hole 250 may increase a temperature of the housing 240 that forms the second inlet 271.

FIG. 6 is a diagram illustrating airflow of the aerosol generating device 200, according to an embodiment.

When a user inhales, air may flow from outside into the aerosol generating device 200 through the first inlet 263 and the second inlet 271. Air introduced into the second inlet 271 may flow downward from the second flow passage 270.

The air passing through the second flow passage 270 may meet air flowing into the inner flow passage 262 from the outer flow passage 261. Air may be heated by the susceptor 230 while passing through the inner flow passage 262, and may be delivered to the aerosol generating article 300.

The aerosol generating device 200 needs to be designed by taking account of various factors such as size, draw resistance, and the like. Since the aerosol generating device 200 includes first and second inhalation passages, the aerosol generating device 200 may be designed to maintain a balance between various factors. For example, if a size of the aerosol generating device 200 has to be reduced by reducing a cross-sectional area of the outer flow passage 261, a cross-sectional area of the second flow passage 270 may be enlarged to compensate for the increase in draw resistance caused by the narrowed outer flow passage 261.

FIG. 7 is a schematic diagram illustrating a temperature distribution in the aerosol generating device 200, according to an embodiment.

Heat is generated from the susceptor 230 heated by the coil 231. FIG. 7 schematically shows the temperature distribution of the aerosol generating device 200 due to the heat of the susceptor 230.

First, second, and third regions G1, G2, and G3 are regions roughly divided based on the temperature distribution. Temperature may be higher in the order of the first region G1, the second region G2, and the third region G3. The third region G3 may be a region at room temperature.

The second inlet 271 is arranged near the insertion hole 250, and the first inlet 263 is arranged at a position lower than a lower end of the susceptor 230. As a result, the second inlet 271 may be included in the second region G2, and the first inlet 263 may be included in the third region G3. That is, a temperature change of air at the first inlet 263 caused by the heated susceptor 230 may be less than a temperature change of air at the second inlet 271 caused by the heated susceptor 230. In addition, a temperature of a portion of the housing 240 that forms the second inlet 271 may be higher than a temperature of a portion of the housing 240 that forms the first inlet 263.

FIG. 8 is a diagram illustrating a flow of air heated by the inner flow passage 262, according to an embodiment.

While a user does not inhale, air flow in the aerosol generating device may not have a dominant direction. For example, air heated from the inner flow passage 262 may flow back into the outer flow passage 261 or the second flow passage 270. When the air heated from the inner flow passage 262 flows back into the outer flow passage 261, the low temperature housing 240 may meet the heated air. Thereby, dew condensation may occur.

On the other hand, since the second inlet 271 and a portion of the housing 240 that forms the second inlet 271 receive heat discharged from the insertion hole 250, even if the air heated from the inner flow passage 262 flows back into the second flow passage 270, the possibility of condensation may be low.

In order to prevent condensation, it is preferable to design the aerosol generating device 200 such that the air heated from the inner flow passage 262 flows back into the second flow passage 270 rather than the outer flow passage 261. To that end, the second flow passage 270 may be formed to extend from the inner flow passage 262 to the second inlet 271, and the second flow passage 270 and the inner flow passage 262 may have the same axis. That is, the second flow passage 270 and the inner flow passage 262 may be aligned with each other as shown in FIG. 8.

FIG. 9 is a diagram illustrating structures of the second flow passage 270 and the connection flow passage 265, according to an embodiment.

As described with reference to FIG. 8, in order to prevent condensation, it is preferable to design an aerosol generating device such that air heated from the inner flow passage 262 flows back into the second flow passage 270 rather than the outer flow passage 261.

To that end, the connection flow passage 265 may be formed to extend perpendicularly from the inner flow passage 262, and the second flow passage 270 may be formed to extend from the inner flow passage 262. In addition, a portion 265LE of a connection flow passage 265 connected to the inner flow passage 262 may have a smaller cross-sectional area than a portion 270LE of a second flow passage 270 connected to the inner flow passage 262.

By such structures of the second flow passage 270 and the connection flow passage 265, dew condensation may be prevented.

FIG. 10 is a diagram illustrating a structure of the second flow passage 270, according to an embodiment.

While a user does not inhale, air flow in the aerosol generating device may not have a dominant direction. For example, air heated from the inner flow passage 262 may flow back into the second flow passage 270. Escape of the heated air into the second inlet 271 may result in heat loss.

In order to prevent such heat loss, the second inlet 271 may have a cross-sectional area less than a cross-sectional area of a portion 270LE of the second flow passage 270 connected to the inner flow passage 262. For example, a stepped structure may be formed in the second inlet 271 as shown in FIG. 10.

By such structure of the second flow passage 270, the air heated from the inner flow passage 262 is retained in the second flow passage 270. Therefore, loss of heat may be prevented.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol generating device comprising:

a housing comprising an insertion hole for receiving an aerosol generating article;

a susceptor located inside the housing and configured to heat the aerosol generating article;

a coil arranged inside the housing to surround the susceptor; and a first flow passage configured to allow air to flow from outside of the housing into the aerosol generating article, wherein the first flow passage comprises:

an outer flow passage formed between the housing and the coil; and an inner flow passage formed between the coil and the susceptor, connected to the outer flow passage and configured to be heated by the susceptor.

2. The aerosol generating device of claim 1, wherein the outer flow passage is formed to extend between the housing and the coil such that air in the outer flow passage flows upward in response to a user's puff, and the inner flow passage is formed to extend between the coil and the susceptor such that air in the inner flow passage flows downward in response to the user's puff.

3. The aerosol generating device of claim 1, further comprising a first inlet configured to introduce air from outside into the outer flow passage, wherein the first inlet is arranged on a side surface of the housing.

4. The aerosol generating device of claim 3, wherein the first inlet is arranged at a position lower than a lower end of the susceptor.

5. The aerosol generating device of claim 3, further comprising a second flow passage configured to allow air to flow from outside of the housing into the first flow passage.

6. The aerosol generating device of claim 5, further comprising a second inlet configured to introduce air from outside into the second flow passage, wherein the second inlet is arranged on an upper surface of the housing.

7. The aerosol generating device of claim 6, wherein the second inlet is adjacent to the insertion hole such that air in the second flow passage has a higher temperature than air in the outer flow passage when the susceptor generates the heat.

8. The aerosol generating device of claim 6, wherein the second flow passage extends from the inner flow passage to the second inlet and is aligned with the inner flow passage.

9. The aerosol generating device of claim 6, wherein the second inlet has a smaller cross-sectional area than a portion of the second flow passage connected to the inner flow passage.

10. The aerosol generating device of claim 6, wherein a temperature change of air at the first inlet caused by the susceptor heated by the coil is less than a temperature change of air at the second inlet caused by the susceptor heated by the coil.

11. The aerosol generating device of claim 5, further comprising a connection flow passage formed to extend from the outer flow passage to the inner flow passage, wherein the connection flow passage is arranged above an upper end of the coil.

12. The aerosol generating device of claim 11, wherein the connection flow passage is formed to extend perpendicularly from the inner flow passage.

13. The aerosol generating device of claim 11, wherein a portion of the connection flow passage connected to the inner flow passage has a smaller cross-sectional area than the portion of the second flow passage connected to the inner flow passage.

14. The aerosol generating device of claim 11, wherein the connection flow passage has a smaller cross-sectional area than the inner flow passage.

* * * * *